United States Patent
Bejarano Daza

(12) 
(10) Patent No.: US 11,479,316 B2
(45) Date of Patent: Oct. 25, 2022

(54) EXTERNAL PROTECTION DEVICE FOR VEHICLES AND HEADS

(71) Applicant: Javier Eduardo Bejarano Daza, Bogota (CO)

(72) Inventor: Javier Eduardo Bejarano Daza, Bogota (CO)

(*) Notice: Subject to any disclaimer, the term of this patent is extended or adjusted under 35 U.S.C. 154(b) by 371 days.

(21) Appl. No.: 16/738,588

(22) Filed: Jan. 9, 2020

(65) Prior Publication Data

US 2020/0277015 A1 Sep. 3, 2020

Related U.S. Application Data

(63) Continuation-in-part of application No. PCT/CO2017/000004, filed on Jul. 10, 2017.

(51) Int. Cl.
| | |
|---|---|
| *B62J 17/083* | (2020.01) |
| *A42B 3/32* | (2006.01) |
| *B62J 17/08* | (2020.01) |
| *B62J 27/00* | (2020.01) |
| *B62J 17/10* | (2020.01) |

(52) U.S. Cl.
CPC ............ *B62J 17/083* (2020.02); *A42B 3/32* (2013.01); *B62J 17/08* (2013.01); *B62J 17/10* (2020.02); *B62J 27/00* (2013.01)

(58) Field of Classification Search
CPC ......... B62J 1/18; B62J 1/20; B62J 1/22; B62J 17/083
See application file for complete search history.

(56) References Cited

U.S. PATENT DOCUMENTS

| | | | | |
|---|---|---|---|---|
| 5,685,388 A | * | 11/1997 | Bothwell | B62K 11/00 280/755 |
| 6,017,076 A | * | 1/2000 | Belisle | B62J 17/086 296/78.1 |
| 8,532,915 B2 | * | 9/2013 | Kim | B62K 11/007 701/124 |
| 2011/0221177 A1 | * | 9/2011 | Srabstein | B62J 27/10 280/756 |
| 2017/0203804 A1 | * | 7/2017 | Haines | B62K 5/007 |

FOREIGN PATENT DOCUMENTS

| | | |
|---|---|---|
| CN | 201370146 Y | 12/2009 |
| ES | 2335821 T3 | 4/2010 |
| FR | 2649064 A1 | 1/1991 |
| JP | 3155278 U | 11/2009 |

OTHER PUBLICATIONS

Unknown, A Protect Cover Structure for Two Wheel Vehicle, Jan. 23, 2009, EPO, KR 20-2009-0000724 U, Machine Translation of Description (Year: 2009).*
Unknown, Motorcycle Shield, Nov. 12, 2009, EPO, JP 3155278 U, Machine Translation of Description (Year: 2009).*
ISA; Inapi, AV. Libertador Bernardo O'Higgins 194, PISO 17, Santiago, Chile; Jan. 17, 2018.

* cited by examiner

*Primary Examiner* — James A English
(74) *Attorney, Agent, or Firm* — Patshegen IP; Moshe Pinchas

(57) ABSTRACT

A rigid and aerodynamic device for external protection for motorcycle and bicycle vehicles with 2 to 4 wheels. This removable dome type device is formed by multiple overlapping panels that form an oval shell type structure, which protects both the vehicle and the pilot from external weather conditions and physical damage in the event of a collision.

4 Claims, 7 Drawing Sheets

EXTERNAL PROTECTION DEVICE FOR VEHICLES AND HEADS

SUMMARY OF THE INVENTION

In a first aspect, the present invention relates to a rigid and aerodynamic device for external protection for motorcycle and bicycle vehicles with 2 to 4 wheels. This removable dome type device is formed by multiple overlapping panels that form an oval shell type structure, which protects both the vehicle and the pilot from external weather conditions and physical damage in the event of a collision.

In a second aspect, the present invention describes a rigid and aerodynamic outer protection device for the head formed by multiple overlapping panels that form an oval shell-shaped structure, which protects the user's skull from external weather conditions and physical damage. In case of collision.

FIELD OF THE INVENTION

The present invention is related to a rigid and aerodynamic device formed by multiple overlapping panels that form an oval shell type structure with application for external protection of motorcycle and bicycle type vehicles with 2 to 4 wheels and as a head helmet.

BACKGROUND OF THE INVENTION

In the field of transport, it has been necessary to develop elements that allow the user to protect a motorcycle and bicycle type vehicle with 2 to 4 wheels from external weather conditions and physical damage in the event of a collision. Initially, the development of the structures was oriented towards the protection of the skull of motorcyclists and cyclists by means of rigid protective helmets and, subsequently, towards the integral protection of the pilot by means of devices that allow him to protect against physical damages in the event of a collision and in addition to external weather conditions.

In fact, in the state of the art related to the protection structures of motorcycle and 2 to 4-wheel vehicles, there are publications such as U.S. Pat. No. 3,979,147 which teaches a rigid, transparent, thermoplastic and semicircular cover that is coupled and uncoupled by a connection clip on the rear of the vehicle that seeks to protect the pilot from external weather conditions and U.S. Pat. No. 5,791,718 that teaches a protection device that includes a windshield frame, rigid frame and a flexible transparent cover that includes side sections that allow the entrance and exit of the pilot.

Other developments, such as the FR2768389 patent, reveal a 2-wheeled motorcycle that has a retractable cover and removable doors to form a compartment and a two-sectional floor in the form of side fins that can be raised to allow the driver to put his feet on top the ground and keep your balance when you stop, and the U.S. Pat. No. 8,360,084 that teaches a protective structure that includes a cover with a central frame, an upper and lower U-shaped frame, all fixed and transverse pivoting belts that give stability to the main frame.

More recently, protective structures have been proposed to prevent or minimize damage to the pilot in the event of an accident, such as document U.S. Pat. No. 5,685,388 that it comprises a body that incorporates a lower part in which the lower torso and legs of the driver are housed and an upper part that includes a windshield and an open or removable cover that allows the driver to drive the motorcycle, where said body incorporates windows or panels operable or removable for ventilation and access, and U.S. Pat. No. 8,322,749 describing a modular structure of mountable and detachable protection of the vehicle comprising a plurality of longitudinal, transverse and diagonal bars that define an ovoid configuration incorporating fixed and/or removable cover panels capable of guaranteeing high impact resistance.

Although the state of the art shows the development of different structures for the protection of motorcyclists and cyclists from 2 to 4 wheels, it is necessary to design a structure for easy installation and removal of motorcycle vehicles and type 2 bicycle 4-Wheel, with an aerodynamic design that reduces the resistance of the air during the movement of the vehicle and protects both the vehicle and the driver from external environmental conditions (rain, wind, light, for example) and physical damage in case of collision or aggression by abrupt blows or blunt elements.

The object of this invention overcomes the limitations inherent to existing elements, since it provides a rigid device consisting of multiple overlapping panels that form an oval shell-like structure for motorcycle and bicycle type vehicles with 2 to 4 wheels for quick installation in the vehicle chassis and easily removable that ensures the decrease of resistance to air in motion and the protection of the pilot and the vehicle from external conditions.

OBJECTS OF THE INVENTION

The invention relates in a first aspect to a rigid and aerodynamic device for external protection for motorcycle and bicycle vehicles with 2 to 4 wheels. In particular, the present invention corresponds to a removable dome type device consisting of multiple overlapping panels that form an oval shell type structure, which protects both the vehicle and the pilot from external weather conditions and physical damage in case of collision.

In a second aspect, the invention relates to a rigid and aerodynamic device for external head protection consisting of multiple overlapping panels that form an oval shell-shaped structure, which protects the user's skull from external weather conditions and the hurt physical in case of collision.

DETAILED DESCRIPTION OF THE INVENTION

The objective of this invention is to provide a rigid and aerodynamic outer protection device formed by multiple overlapping panels coupled by one or more pins that allow the movement of the panels from front to back when the opening or closing of the device is required, where said panels these form an oval shell type structure.

First Aspect of the Invention

In a first aspect, two modalities of the rigid and aerodynamic external protection device are described, characterized in that it is installed in the chassis of a motorcycle or bicycle type vehicle with 2 to 4 wheels.

Mode 1

Figure 1:
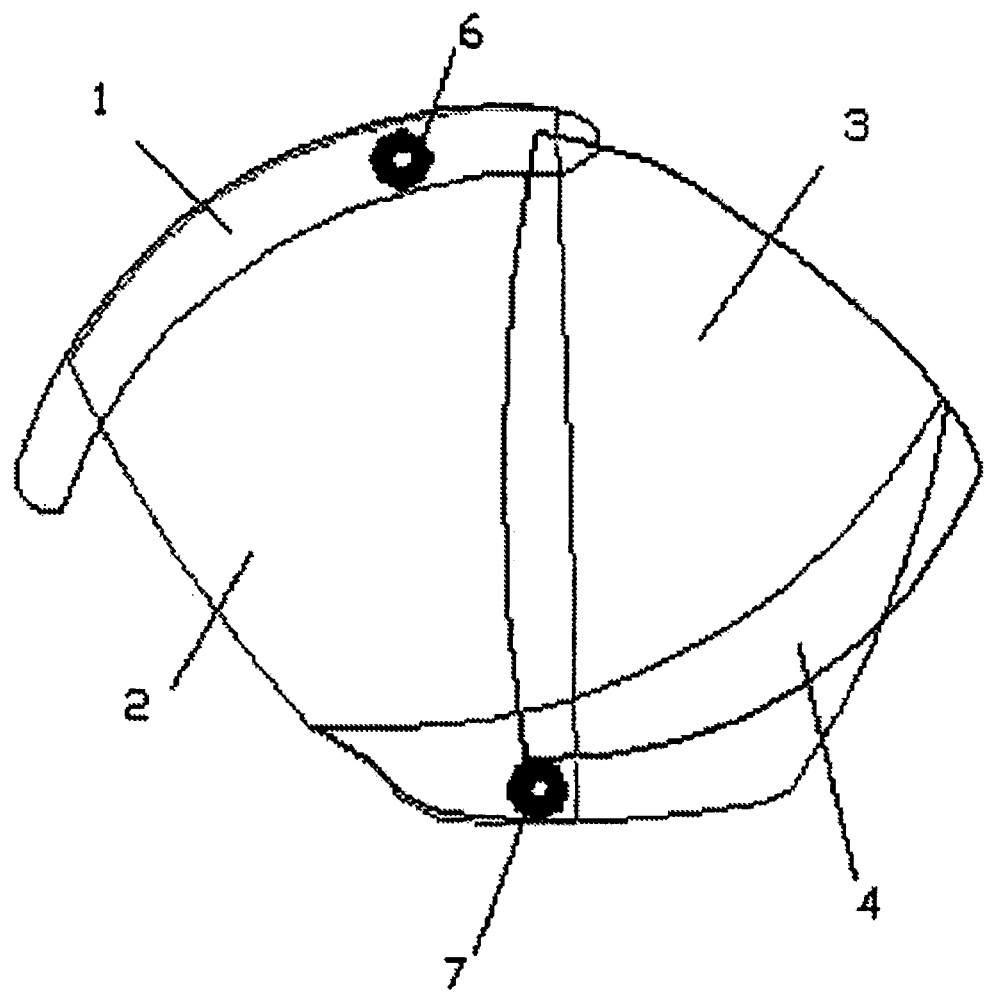
FIG. 1 shows a side view of the first embodiment of the rigid exterior protection device for vehicles of the invention.
Figure 2:
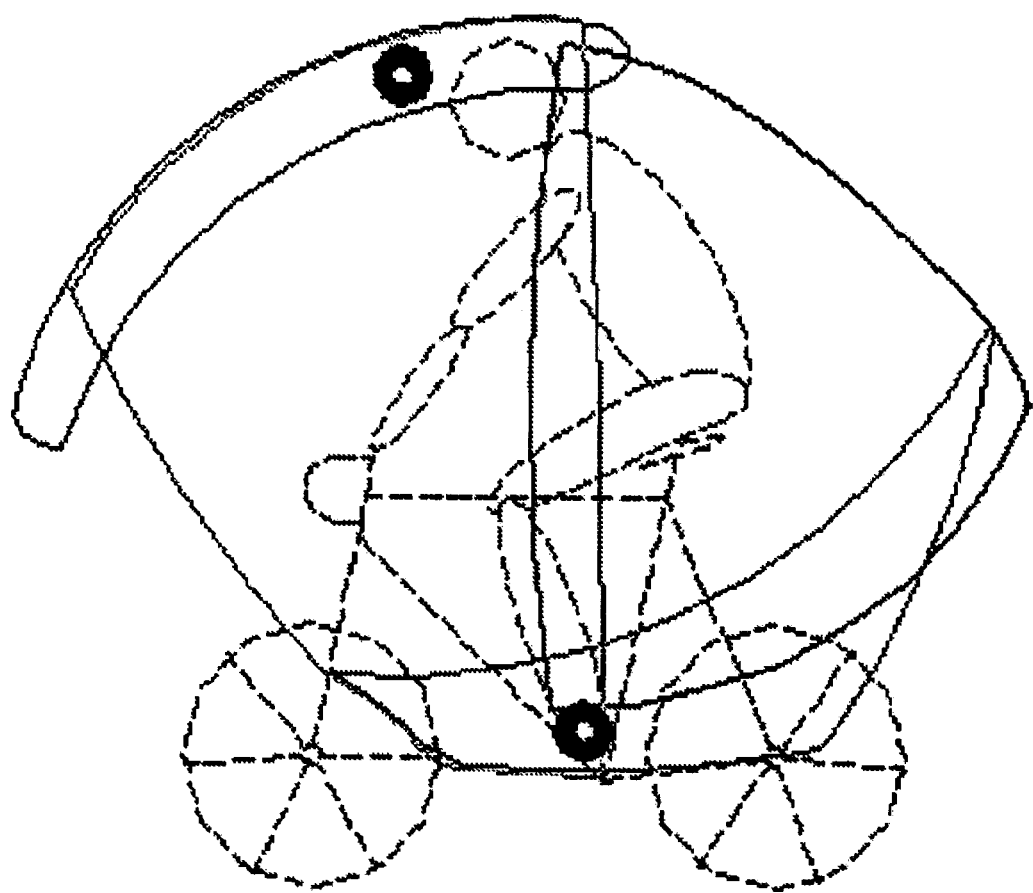
FIG. 2 shows a side view of the first embodiment of the rigid device of the invention mounted on a vehicle of the type of two-wheel bicycle.

As can be seen in FIGS. 1 and 2, the device of the invention corresponds to an oval shell shaped dome formed by a panel (1) located in the upper central part of the device, a panel (2) located in the part anterior that extends perpendicular to the longitudinal axis of the device and below the panel (1) that forms the front side walls of the device, a panel (3) located at the rear that extends perpendicular to the longitudinal axis of the device that forms the side walls The device and a lower panel (4), where the panels (1 and 2) are coupled by a pin-type joint (6) located on the top of the device, the panels (2 and 3) are coupled by a device The pin-type joint (7) located on the bottom of the device and the bottom panel (4) can be moved forward to close the structure or back to allow the driver to rest his legs on the asphalt using two bands attached to the vehicle brake system. As seen in FIG. 2, the device of the invention is installed in the chassis of the 2 to 4 wheel vehicle using two fasteners (8) coupled to the central axle of the rear wheel (s) of the vehicle; This allows said external protection dome device to be easily installed or uninstalled, since it does not require specialized tools, so the user has the ability to install and remove it as necessary. Similarly, the motorcycle or bicycle vehicle with 2 to 4 wheels incorporating the device of the invention can be moved with the oval shell type structure closed or with the structure open, that is, when the upper panel (1) and the panel the sides (2) move backwards, so that the structure of the device does not prevent the movement of the equipment.

The coupling pins of the panels are located at the top (6) and bottom (7) of the structure, so that these allow the joining of the panels and their movement forward or backward; when the upper panel (1) and the side panel (2) move forward, the closed oval shell type structure is characterized in that the upper panel (1) extends over the front panels forming a tightly closed structure. On the other hand, the bottom panel (4) can be moved forward to close the structure or backwards to allow the driver to rest his legs on the asphalt at the moment the vehicle is static. For this, the device incorporates two bands coupled to the vehicle's brake system, which are anchored to the rear panel (3) and allow the lower panel (4) to move back and forth.

The movement of the upper panel (1) and the side panel (2) can be performed manually by means of a lever located on the rear panel (2) or electronically by means of a motor that exerts a circular movement on the pins (6 and 7).

Mode 2

Figure 3:
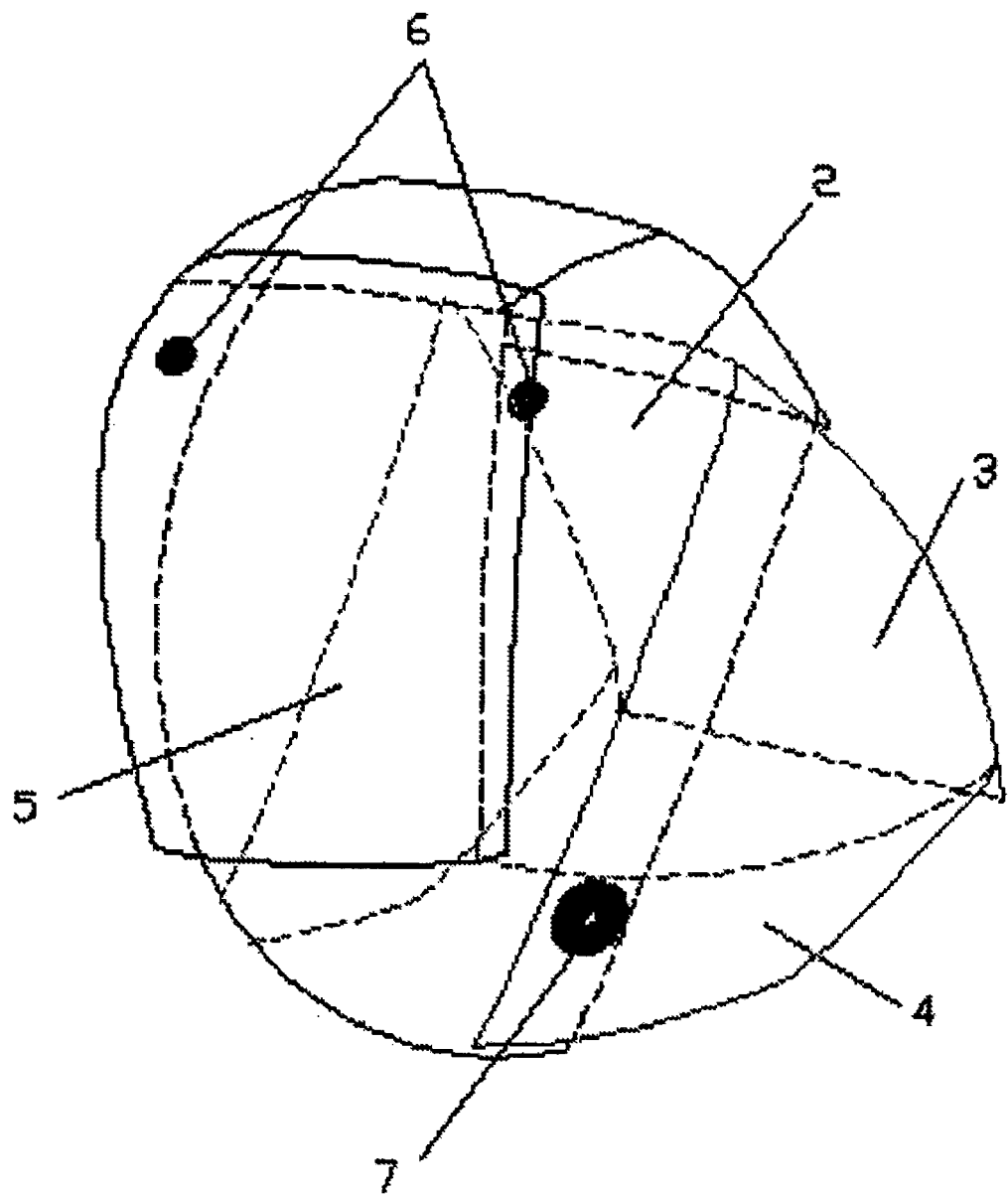
FIG. 3 shows a side view of the second embodiment of the rigid exterior protection device for vehicles of the invention.
Figure 4:
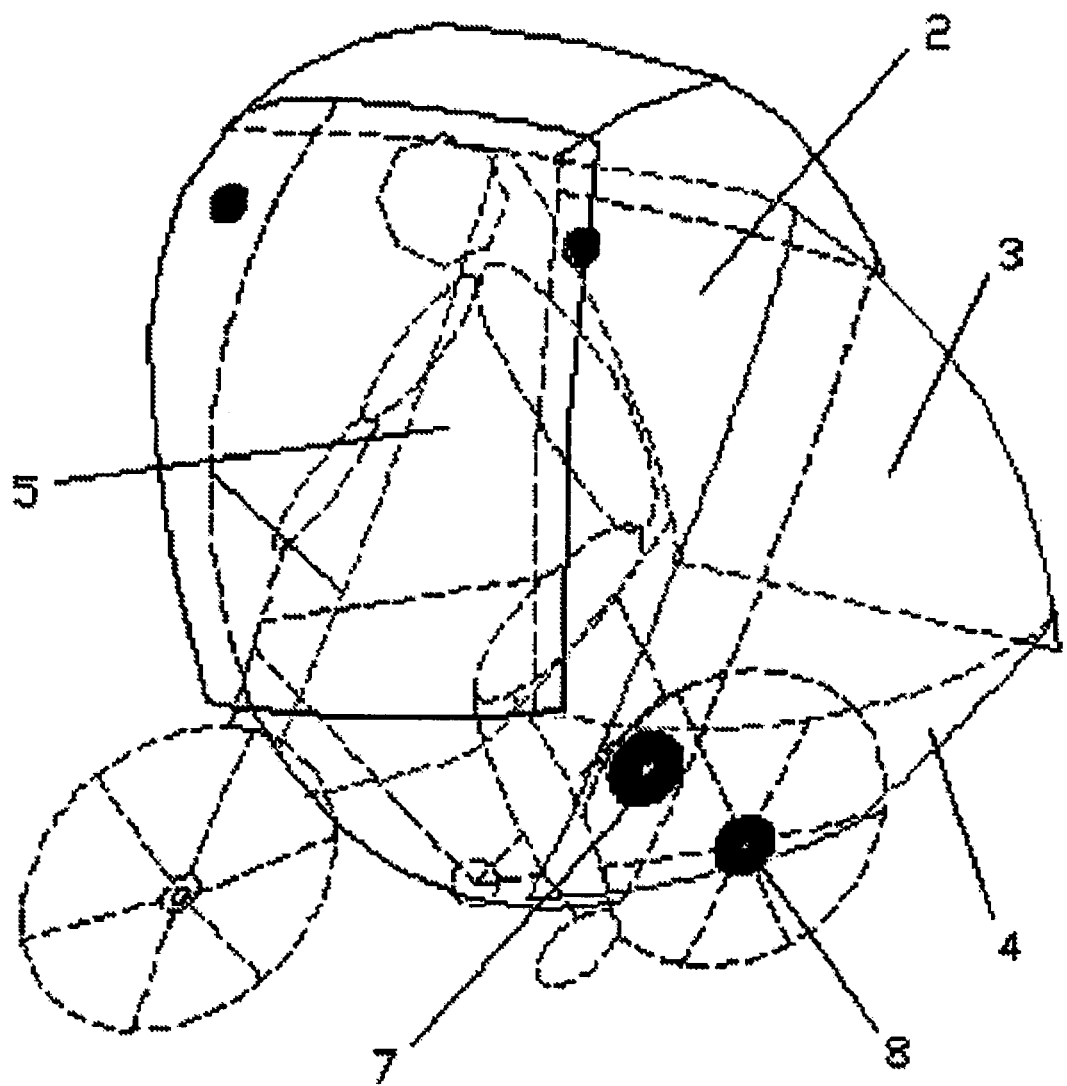
FIG. 4 shows a perspective view of the second embodiment of the rigid device of the invention mounted on a vehicle of the type of two-wheel bicycle.

As can be seen in FIGS. 3 and 4, the device of the invention can be formed by a front panel (5), a panel (2) located in the front part that extends perpendicular to the longitudinal axis of the device forming the upper wall and the front side walls of the device, a panel (3) located at the rear that extends perpendicular to the longitudinal axis of the device that forms the rear side walls of the device and a bottom panel (4), where the panels (2 and 5) are coupled by a pin-type joint (6) located on the top of the device, the panels (2 and 3) are coupled by a pin-type joint (7) located on the bottom of the device and the bottom panel (4) It can be moved forward to close the structure or backward to allow the driver to hold his legs on the asphalt by two bands attached to the vehicle's brake system. As seen in FIG. 4, the device of the invention is installed in the chassis of the 2 to 4 wheel vehicle using two fasteners (8) coupled to the central axle of the rear wheel (s) of the vehicle; This allows said external protection dome device to be easily installed or uninstalled, since it does not require specialized tools, so the user has the ability to install and remove it as necessary. Similarly, the motorcycle or bicycle vehicle with 2 to 4 wheels incorporating the device of the invention can be moved with the oval shell type structure closed or with the structure open, that is, when the front panel (5) and the panel the sides (2) move backwards, so that the structure of the device does not prevent the movement of the equipment.

The coupling pins of the panels are located at the top (6) and bottom (7) of the structure (one on each side), so that they allow the panels to be joined and their movement forward or backward; when the front panel (5) and the side panel (2) move forward, the closed oval shell type structure is characterized in that the front panel (5) extends in the vertical axis perpendicular to the axis to the longitudinal axis of the device and in front of the handlebar of the vehicle to the front tire of the same. On the other hand, the bottom panel (4) can be moved forward to close the structure or backwards to allow the driver to rest his legs on the asphalt at the moment the vehicle is static. For this, the device incorporates two bands coupled to the vehicle's brake system, which are anchored to the rear panel (3) and allow the lower panel (4) to move back and forth.

The movement of the front panel (5) and the front side panel (2) can be done manually by a lever located on the rear panel (3) or electronically by a motor that exerts a circular motion on the pins. (6, 7).

Second Aspect of the Invention

To illustrate the second aspect of the invention, a rigid and aerodynamic outer head protection device is described consisting of multiple overlapping panels that form an oval shell-like structure, which protects the user's skull from external weather conditions and the hurt physical in case of collision.

Figure 5:
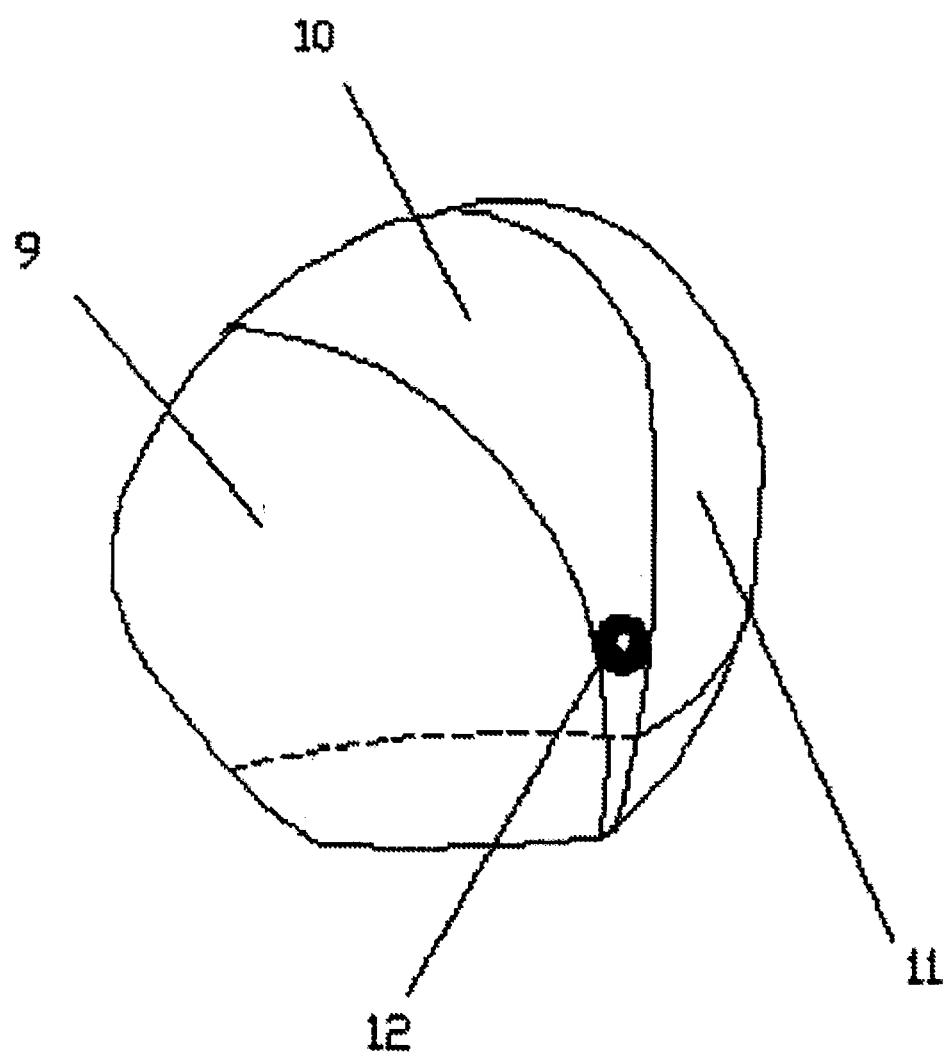
FIG. 5 presents a perspective view of the second aspect of the invention: rigid external head protection device.
Figure 6:
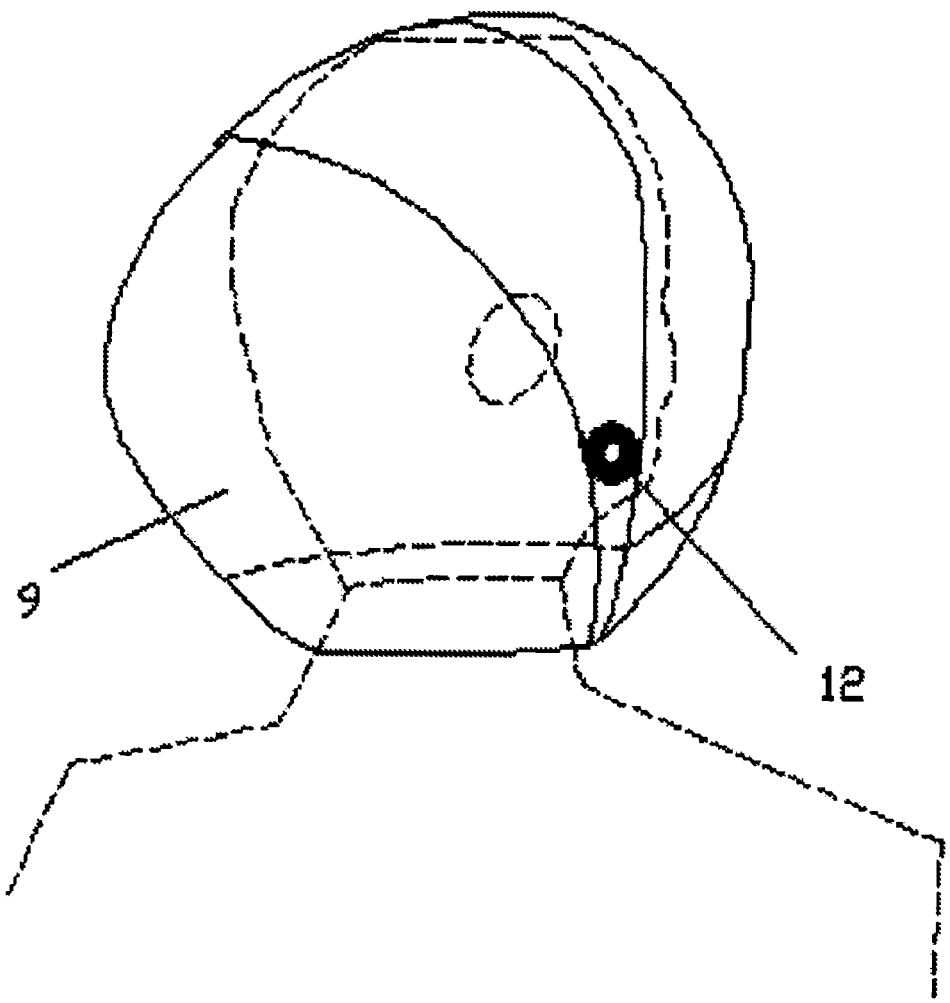
FIG. 6 shows the same view with a head inside the rigid outer protection device.

As can be seen in FIGS. 5 and 6, the external head protection device comprises a rear panel (9), an upper panel (10) and a front panel (11), which are coupled by pin-type joints (12)—one on each side, which allow the movement of the upper (10) and front (11) panels from the front of the helmet to the back when opening the helmet is required device and opposite when you want to close it. As seen in FIG. 6, the device of the invention is supported on the user's neck.

The coupling pins of the panels are located in the lateral part on each side of the structure, so that they allow the joining of the panels and the movement of the upper (10) and frontal panels (11) forward or backward; when said panels move forward, the closed oval shell type structure is characterized in that the front panel (11) extends in the vertical axis perpendicular to the upper panel (10) and in front of the user's face forming a well-closed structure.

General Characteristics of the Invention

In relation to the dimensions of the device of the invention, the structure is no longer than the two-wheeled vehicle in which it is installed, that is, approximately between 1000 and 3000 mm and width between 300 and 2000 mm, so that only Increase the space occupied by a motorcycle-type vehicle and bicycle from 2 to 4 wheels by a factor of 2.

Due to the structure of the device formed by multiple overlapping panels, an internal waterproofing effect is achieved since the water does not penetrate the structure due to a gravity irrigation system that causes the water to slide through the outside without reaching the inside the device thanks to this configuration, the device does not require sealing rubber, since water does not penetrate the top of the panels due to gravity. However, the spaces that remain between the panels allow air circulation.

Within the scope of the invention are incorporated other devices or elements that can be adapted to the rigid and aerodynamic device for the external protection of motorcycle vehicles and the 2 to 4 wheel type of the invention, such as: attached windscreen wiper motors, motors for the hermetic closing of the lower panel, air conditioning devices, heating devices, oxygen supply devices, among others.

In relation to the manufacturing materials of the device of the invention, this structure can be manufactured in tempered glass, acrylic or armored material, with the only low weight requirement provided that it offers the necessary resistance to wind, water, short blunt elements and protects the pilot from physical damage in the event of a collision. This material can be translucent, transparent or polarized in different shades of visualization of the interior of the structure, from transparent to totally invisible the interior, as well as the possibility of using materials that incorporate filters of protection against sunlight.

Although the present invention has been described with the preferred embodiments shown, it is understood that modifications and variations that retain the spirit and scope of this invention are understood within the scope of the appended claims.

A mode 3 is added to the international application PCT/CO2017/000004 to the first aspect of the invention:

Mode 3

Figure 7:
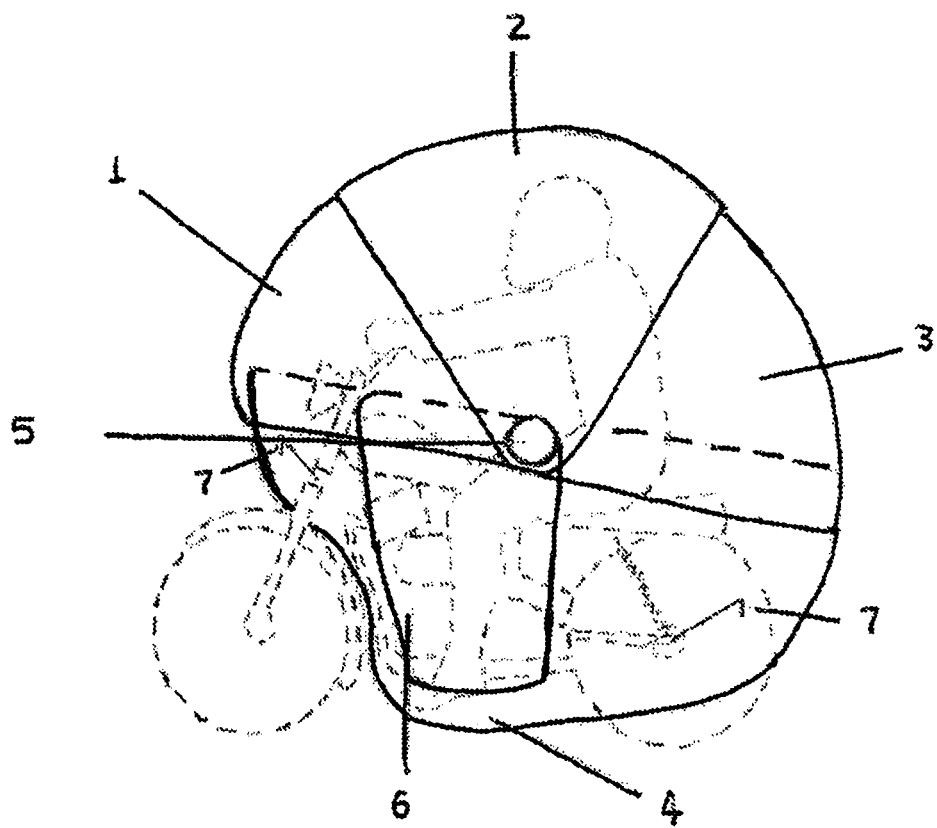
FIG. 7 shows a side view of the third embodiment of the rigid exterior protection device for vehicles of the invention. (additional to application PCT/CO2017/000004).

As seen in FIG. 7, the device of the invention can also be formed by a front panel (1) extending perpendicular to the longitudinal axis of the device that forms the front side walls of the device, a panel (2) located in the front part that extends perpendicular to the longitudinal axis of the device that forms the upper wall and the front side walls of the device, a panel (3) located at the rear that extends perpendicular to the longitudinal axis of the device that forms the rear side walls of the device and a bottom panel (4), where the panels (1, 2 and 3) are coupled by a pin-type joint (5) located at the top of the device. The bottom panel (4) can be moved forward to close the structure or back to allow the driver to hold his legs on the asphalt by two bands attached to the vehicle's brake system or by spring hinges that allow two doors to open the bottom. As seen in FIG. 7, the device of the invention is installed in the chassis of the 2 to 4 wheel vehicle using two fasteners (7) coupled to each side of the central axle of the rear wheel (s) of the vehicle and the fork in the front; This allows the external protection dome device to be easily installed or uninstalled, since it does not require specialized tools, so the user has the ability to install and remove it as necessary. Similarly, the motorcycle or bicycle vehicle with 2 to 4 wheels incorporating the device of the invention can be moved with the oval shell type structure closed or with the structure open, that is, when the front panel (1) and the side panel (2) and the rear panel (3) move backwards, so that the structure of the device does not impede the movement of the vehicle.

The coupling pins of the panels are located in the upper part (5) of the structure (one on each side), so that they allow the joining of the panels and their movement forward or backward; when the front panel (1) and the front panel (2) move forward, the closed oval shell type structure is characterized in that the front panel (1) extends in the vertical axis perpendicular to the axis to the longitudinal axis of the device and in front of the handlebar of the vehicle to the front tire of the same. On the other hand, the bottom panel (4) can be moved forward to close the structure or backwards to allow the driver to rest his legs on the asphalt at the moment the vehicle is static. For this, the device incorporates two bands attached to the vehicle's brake system, which are anchored to the rear panel (3) and allow the lower panel (4) to move back and forth or by means of hinges with springs that allow two doors in the background.

The movement of the front panel (1) and the front side panel (2) can be performed manually by means of a lever located on the rear panel (3) or electronically by means of a motor that exerts a circular movement on the pins. (5)

This device includes a door on each side (6) that is coupled to the pins (5) that move backwards manually or electronically to open the driver's access or exit space.

The invention claimed is:

1. Rigid and aerodynamic external protection device comprising multiple overlapping panels coupled by one or more pins that allow movement of the panels from a front side of the device to a back side of the device when opening or closing of the device is required, where said panels form an oval shell structure;
   wherein the external protection is installed in a chassis of a vehicle having 2 to 4 wheels using two fasteners (8) that are coupled to a central axis of rear wheels of the vehicle,
   wherein the multiple overlapping panels include:
      an upper panel (1) located in an upper central part of the device,
      a front panel (2) located in the front side of the device that extends perpendicular to an axis longitudinal of the device and below the upper panel (1) forming a front side walls of the device,
      a rear panel (3) located at the back side of the device and extends perpendicular to the longitudinal axis of the device forming rear side walls of the device,
      and a bottom panel (4), where the upper panel (1) and the front panel (2) are coupled by an upper pin joint (6) located on top of the device, the front panel (2) and the rear panel (3) are coupled by a lower pin joint (7) located at a bottom of the device and the bottom panel (4) can move forward to form a closed structure or back to allow a driver of the vehicle to support his legs on a surface on which the vehicle is disposed.

2. The rigid and aerodynamic outer protection device of claim 1, characterized in that the movement of the upper panel (1) and the front panel (2) can be manually operated by means of a lever located on the rear panel (3) or electronically by means of a motor that exerts a circular motion on the upper pin joint (6) and the lower pin joint (7).

3. The rigid and aerodynamic outer protection device according to claim 1, wherein the front panel (2) is divided into a frontal portion (5) and a side portion (13) located in the front side of the device that extends perpendicular to the longitudinal axis of the device forming an upper wall of the device and the front side walls of the device, the rear panel (3) located at the back side of the device that extends perpendicular to the longitudinal axis of the device that forms the rear side walls of the device and a bottom panel (4), where the side portion (13) and the frontal portion (5) are coupled by the upper pin joint (6); and wherein at the top of the device, the side portion (13) and the rear panel (3) are coupled by the lower pin joint (7) located at the bottom of the device and the bottom panel (4) can be moved forward to form the closed structure or back to allow the driver of the vehicle to support his legs on the surface on which the vehicle is disposed.

4. The rigid and aerodynamic external protection device according to claim 3, characterized in that the movement of the frontal portion (5) and the side portion (13) can be performed manually by means of a lever located on the rear panel (3) or electronically by means of a motor that exerts a circular motion on the upper pin (6) and lower pin joint (8).

\* \* \* \* \*